United States Patent [19]
Servan-Scheiber et al.

[11] Patent Number: 6,034,661
[45] Date of Patent: Mar. 7, 2000

[54] APPARATUS AND METHOD FOR ADVERTISING IN ZOOMABLE CONTENT

[75] Inventors: Franklin Servan-Scheiber; Andrew M. Proehl, both of New York, N.Y.

[73] Assignees: Sony Corporation, Tokyo, Japan; Sony Electronics, Inc., Park Ridge, N.J.

[21] Appl. No.: 08/856,245

[22] Filed: May 14, 1997

[51] Int. Cl.[7] .................................................. G09G 5/00
[52] U.S. Cl. ............................................ 345/127; 345/439
[58] Field of Search ................................... 345/121, 127, 345/129, 130, 342, 439

[56] References Cited

U.S. PATENT DOCUMENTS

| | | | |
|---|---|---|---|
| 5,105,184 | 4/1992 | Pirani et al. | 345/127 |
| 5,187,776 | 2/1993 | Yanker | 345/439 |
| 5,341,466 | 8/1994 | Perlin et al. | 345/439 |
| 5,596,346 | 1/1997 | Leone et al. | 345/127 |
| 5,675,752 | 10/1997 | Scott et al. | 345/302 |
| 5,703,624 | 12/1997 | van Kruistum | 345/121 |
| 5,790,094 | 8/1998 | Tanigawa et al. | 345/127 |

*Primary Examiner*—Matthew Luu
*Attorney, Agent, or Firm*—Frommer Lawrence & Haug, LLP; William S. Frommer

[57] ABSTRACT

Advertisments are displayed in zoomable content data by fading in and then fading out advertisements between respective zoom levels at which different content data are provided. When first content data is displayed at a first zoom level and a zoom request is received from a user, a portion of the first content data is zoomed in on at which time an advertisement is faded in. As the advertisement fully fades in, the first content data fully fades out and upon continued receipt of the zoom request, the adverisement is zoomed in on at which time second content data fades in. Advertisements also are provided during panning of pannable content data in which an advertisement fades in and then fades out at particular panning levels of the content data.

24 Claims, 7 Drawing Sheets

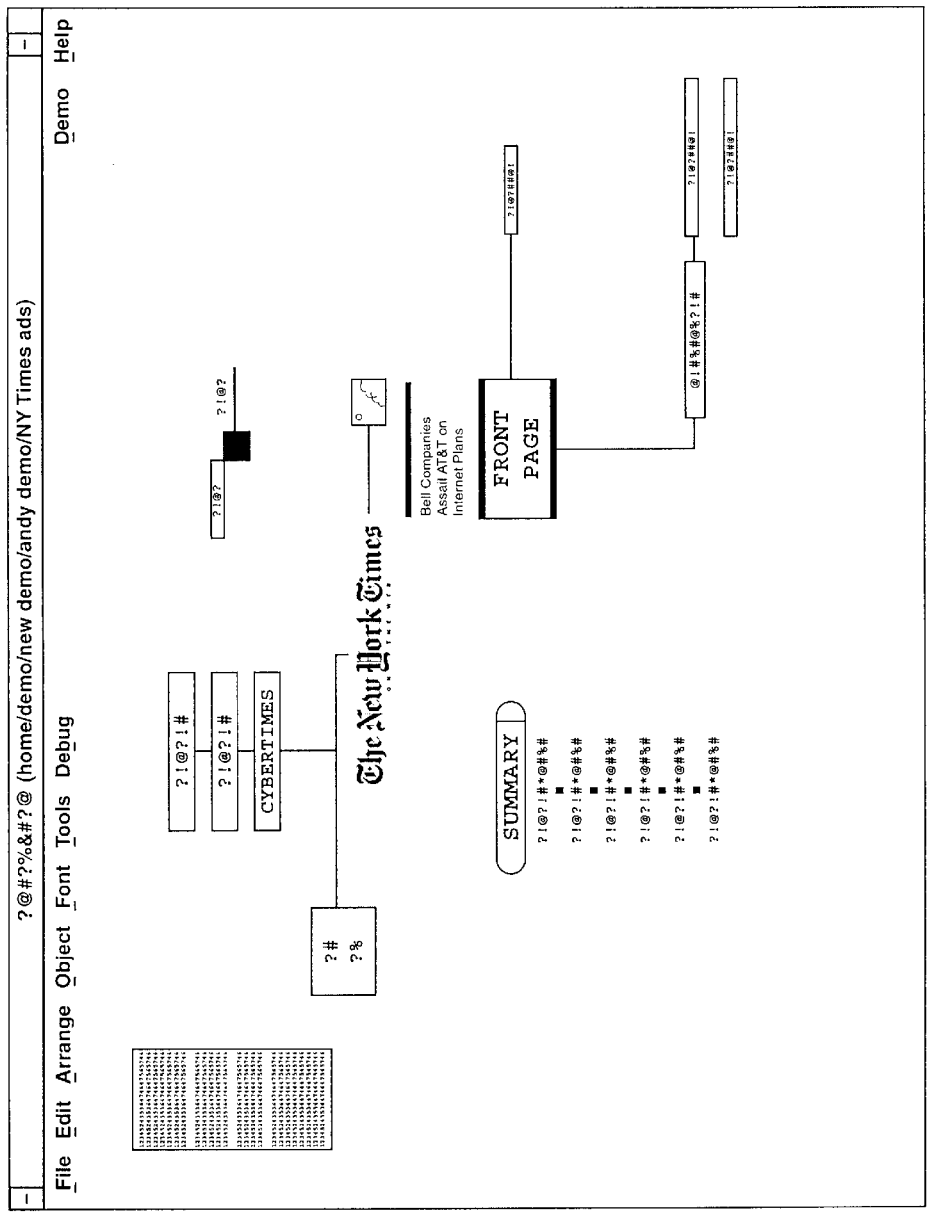

APPARATUS AND METHOD FOR ADVERTISING IN ZOOMABLE CONTENT

BACKGROUND OF THE INVENTION

The present invention relates to apparatus and method for advertising in zoomable content and, more particularly, to apparatus and method for providing advertisements in computer displayed zoomable content data.

As is known, so called internet "push" technologies are bringing the world-wide-web beyond the page framework. "Web" content has been provided in the form of so-called web pages, but soon will be displayed in various other formats, including the formats of ticker tape, Java Applets, floating titles with links to a web page, and shock wave animations. Moreover, so-called "web-enabled" environments which display web data in any shape, in addition to "pages," are being developed.

Advertising in "web-enabled" environments is currently accomplished by displaying so-called "banners", "buttons" or small square banners in particular areas of a web page. Another form of advertisement is to provide an animated (motion) advertisement in the corner of the display while providing the content in the remaining part of the display.

One problem with these types of advertisements is that they generally convey very little information to the user. Providing larger advertisements overcomes this problem but with the adverse effect of diminishing the available space for the "content" data.

OBJECTS OF THE INVENTION

Therefore, it is an object of the present invention to provide apparatus and method for advertising in zoomable content which overcome the shortcomings of current advertising techniques.

Another object of the present invention is to provide a technique for displaying advertisements without limiting the area in which the content data is displayed.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus and method are provided for displaying first content data at a first zoom level, receiving a zoom request from a user, displaying a portion of the first content data with a portion of an advertisement at a second zoom level in response to the zoom request, receiving a second zoom request from the user, and displaying the advertisement without the first content data at a third zoom level when the second zoom request is received.

As one aspect of the present invention, the portion of the first content data being displayed at the first zoom level is enlarged when it is displayed at the second zoom level.

As another aspect of the present invention, the advertisement fades in as the first content data is zoomed in on, and the first content data then fades out as the advertisement fades in.

As yet a further aspect of the present invention, a third zoom request is received from the user, a portion of a second content data is displayed with a portion of the advertisement at a fourth zoom level in response to the third zoom request, a fourth zoom request is received, and the second content data then is displayed without the advertisement at a fifth zoom level.

As a feature of this aspect, the second content data fades in as the advertisement zooms in, and then the advertisement fully fades out.

In accordance with another embodiment of the present invention, apparatus and method are provided for displaying a portion of content data on a display, that portion of the content data being displayed being defined as a panning level, receiving a panning request from a user, panning the content data in a direction in accordance with the panning request, and displaying with the content data an advertisement at a predetermined panning level.

As one aspect of this embodiment, the advertisement fades in at a first panning level and fades out at a second panning level.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 2 is a schematic illustration of a full-screen display of content data fully zoomed out;

DETAILED DESCRIPTION OF CERTAIN PREFERRED EMBODIMENTS

Figure 1:
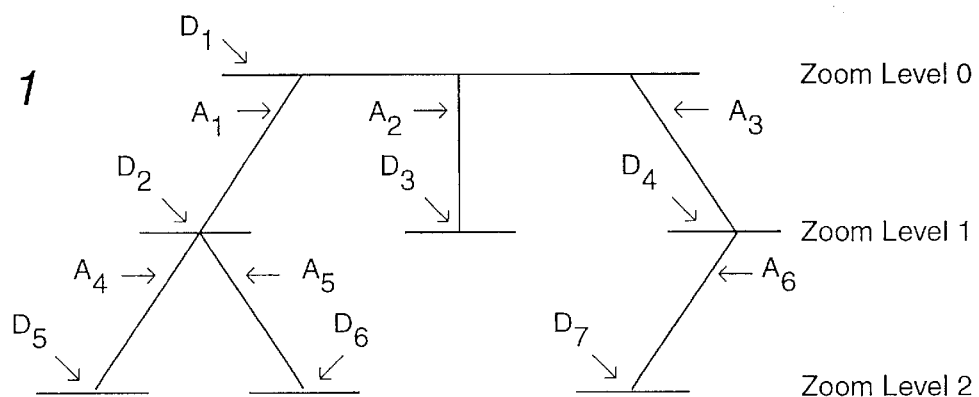
FIG. 1 is a schematic illustration showing the different zoom levels of zoomable displayable information having content data and advertisements therein in accordance with the present invention.
Figure 3:
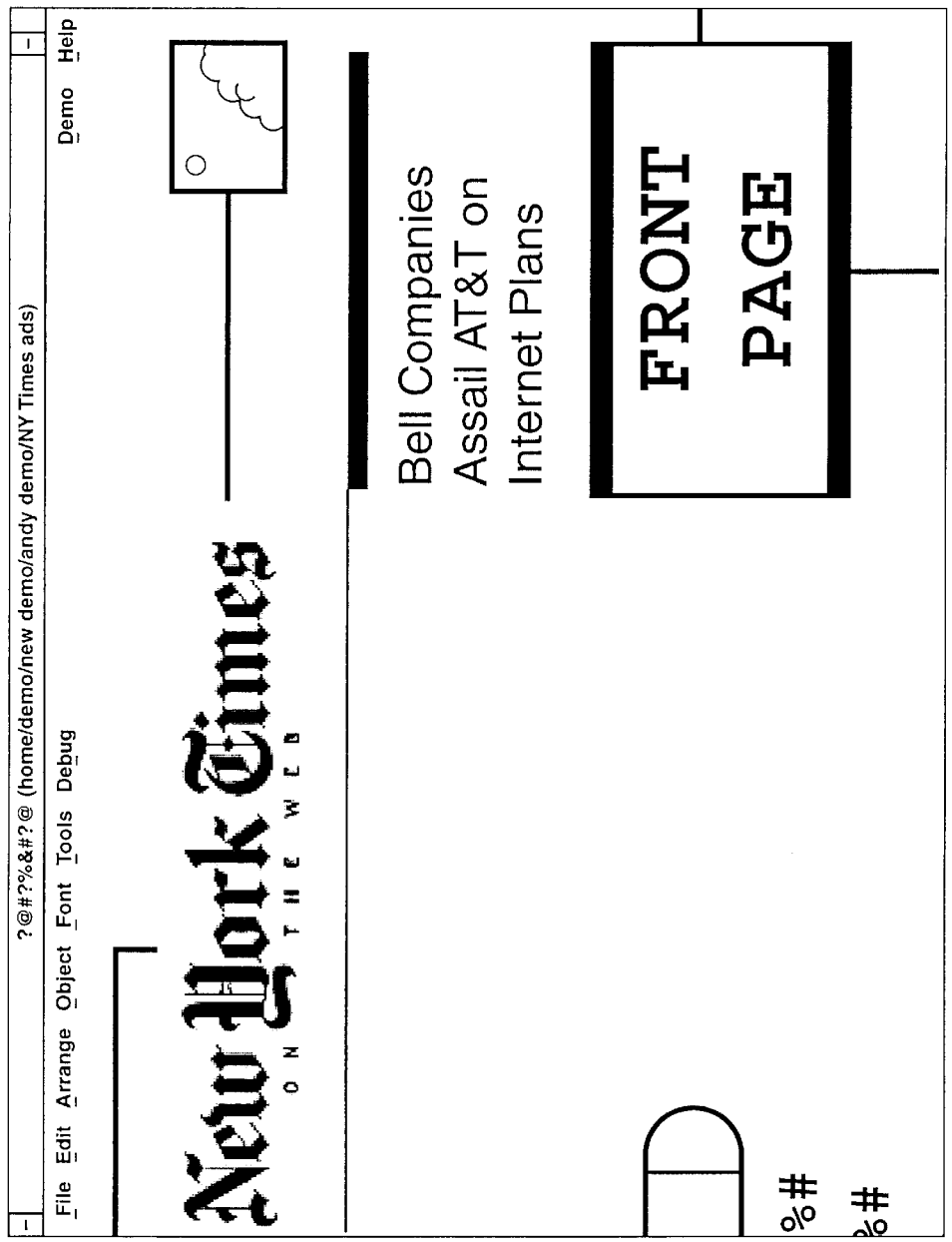
FIG. 3 is a schematic illustration of the display of FIG. 2 partially zoomed-in in accordance with the present invention.

Zoomable content refers to displayable information that is organized into a number of so-called "zoom levels" in which different data is displayed to a user, for example, on a computer monitor, at each respective zoom level. Referring to FIG. 1 of the drawings, a schematic illustration of zoomable content having a tree-like structure is shown. Zoom level 0 corresponds to the level at which the display is fully zoomed-out (i.e., further zooming out is not possible). Display D1 in FIG. 1 represents the display at zoom level 0, and FIG. 2 is a schematic illustration of an exemplary web page that is displayed at zoom level 0. Using mouse or keyboard inputs (or other input devices), the user may zoom in on a particular portion of the display, wherein the zoomed in portion is expanded, such as schematically shown in FIG. 3. The zoom level of the schematic illustration of FIG. 3 is somewhere between zoom level 0 and zoom level 1, for example, zoom level 0.3. As will be discussed, different content is displayed at zoom level 1. And, as is well known in the art, the operations of zooming in and zooming out may be achieved by means of a computer system, which generally includes a monitor, a motherboard (i.e., the controller), a keyboard, a hard-drive, etc., and appropriate software, and since the general operation of a computer system is well known in the art, further description thereof is omitted herein except where necessary for an understanding of the present invention.

Figure 4:
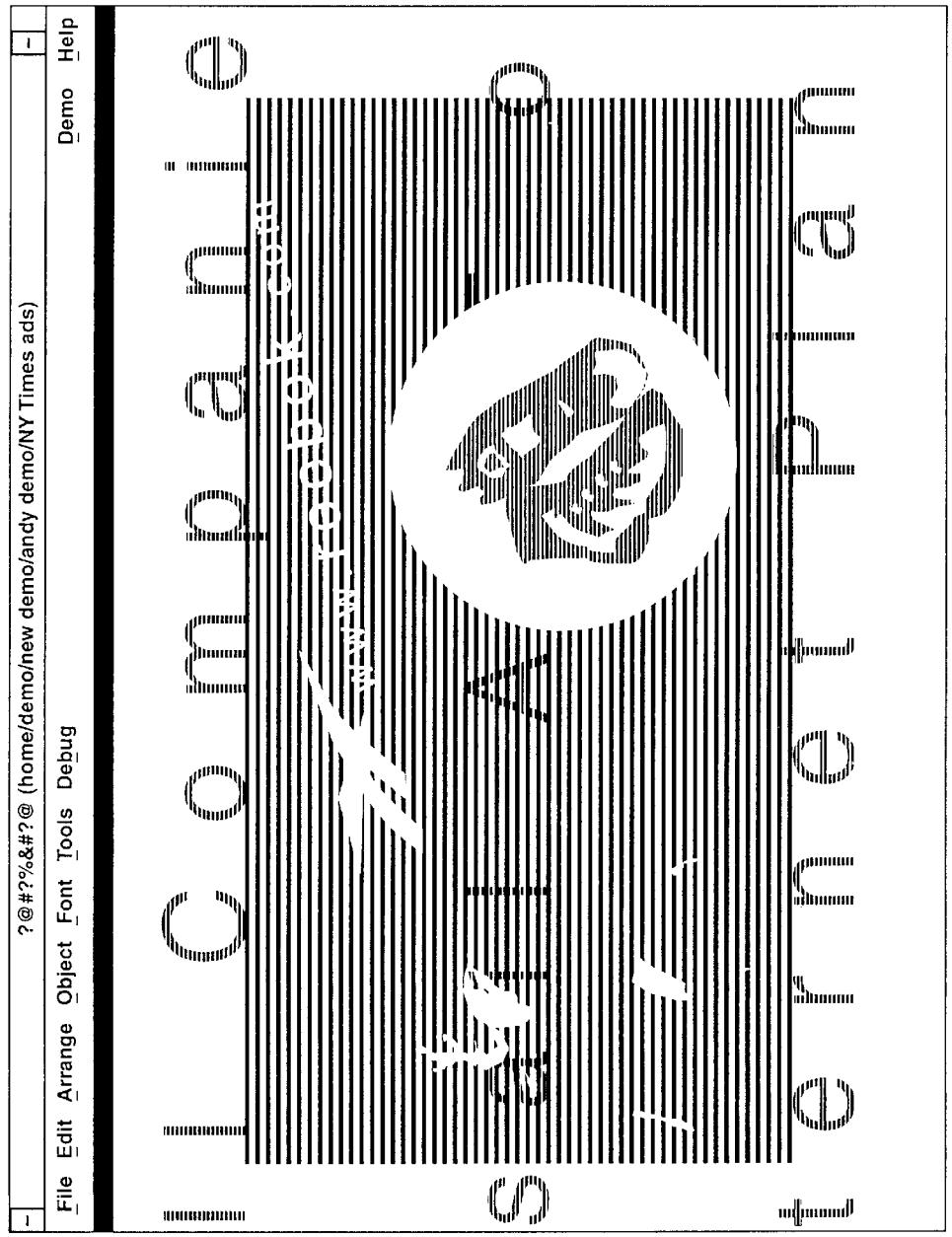
FIG. 4 is a schematic illustration of a display during zooming in and showing an advertisement in accordance with the present invention.
Figure 5:
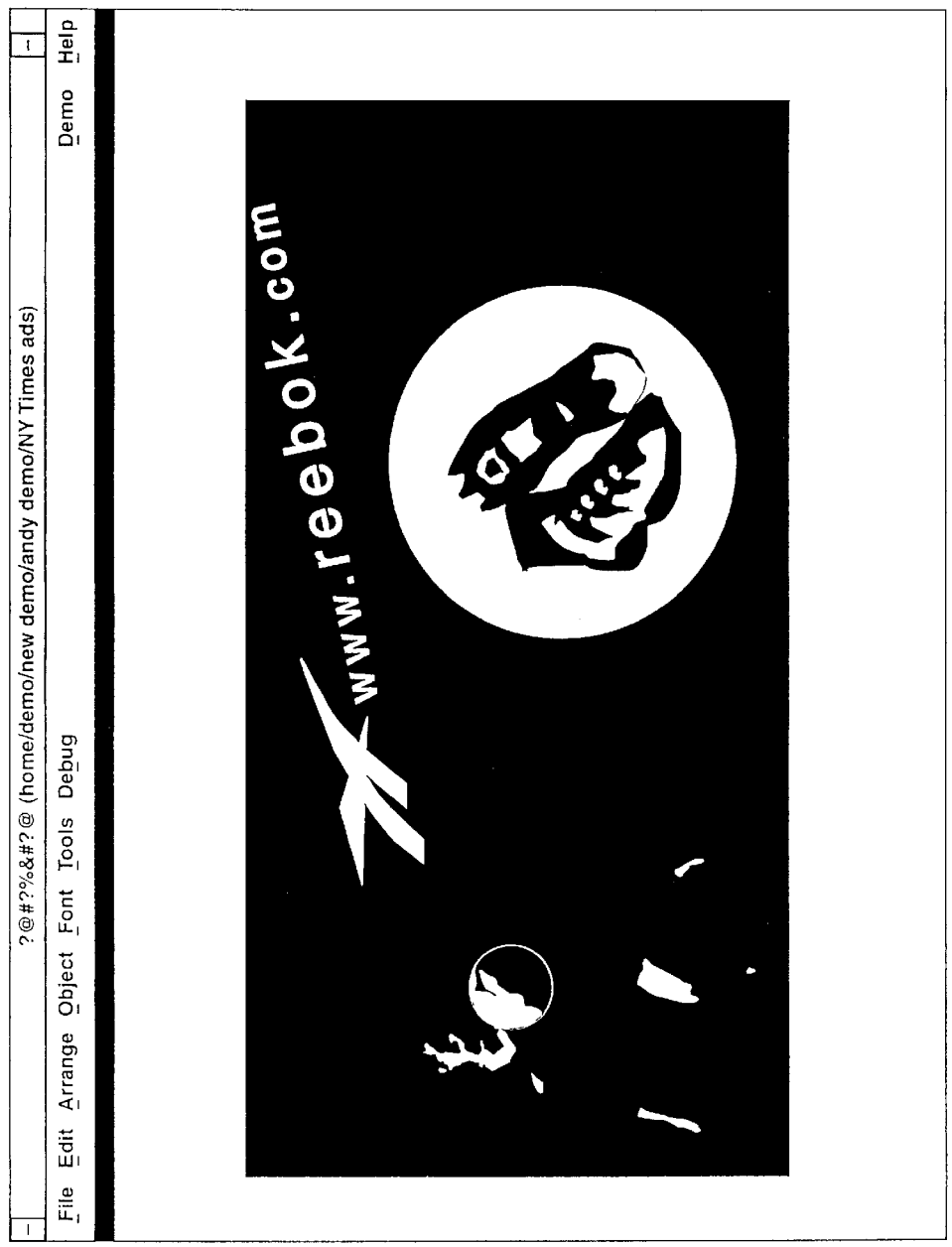
FIG. 5 is a schematic illustration of the advertisement fully displayed in accordance with the present invention.

In accordance with the present invention, an advertisement is provided between the display of content data at zoom level 0 and the display of other content data at zoom level 1. That is, as a particular area of the display is zoomed in on, an advertisement fades in, such as shown in FIG. 4. As the display further zooms in, the advertisement becomes fully displayed and the content data fully fades out, such as shown in FIG. 5. Referring back to FIG. 1, display D1 is at zoom level 0 and is shown in FIG. 2, and display A1 is an advertisement, such as shown in FIG. 5, and is fully displayed at, for example, zoom level 0.5. The display shown in FIG. 4 illustrates the advertisement partially zoomed in and the content data partially zoomed out, and is at a zoom level somewhere between 0 and 0.5.

Figure 6:
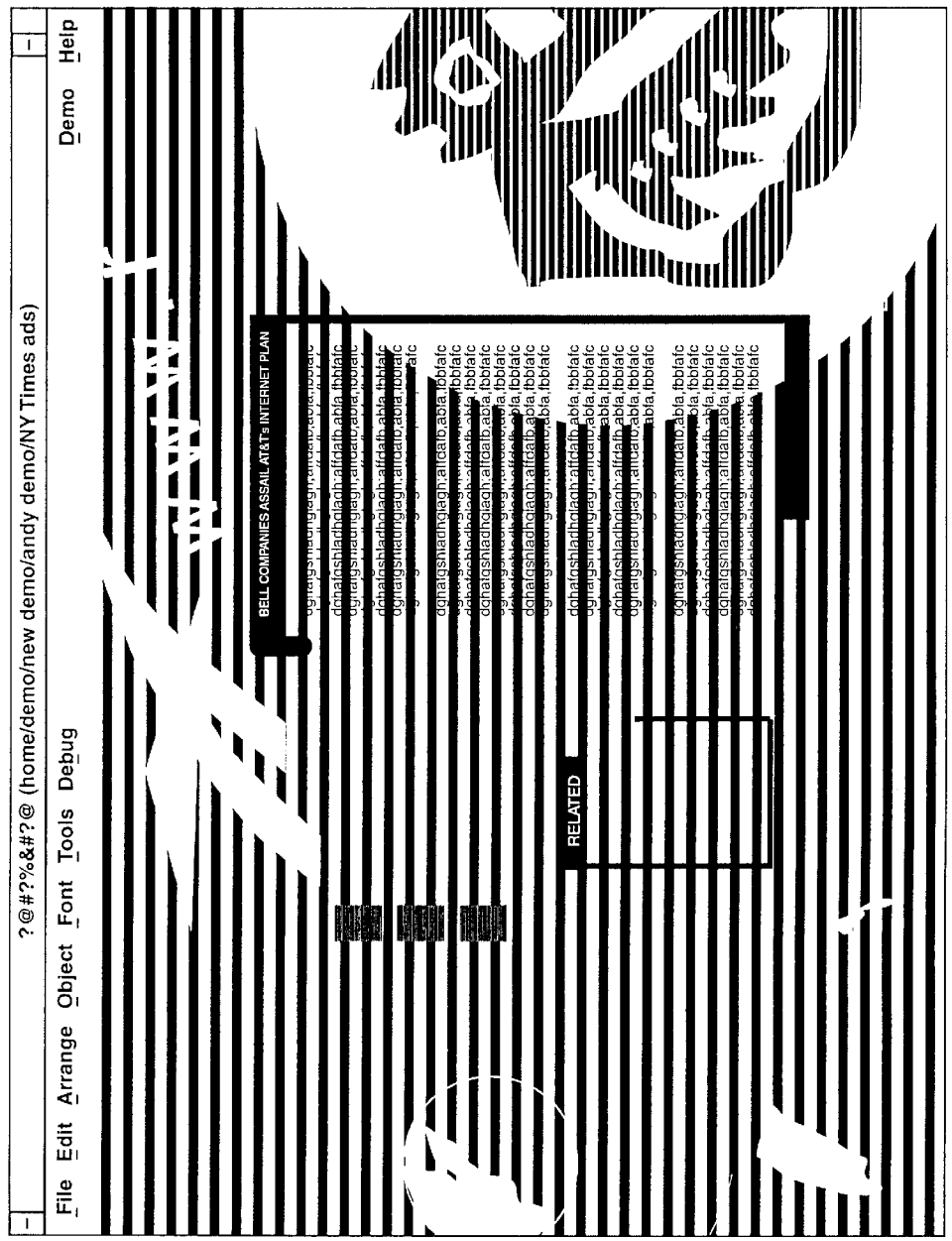
FIG. 6 is a schematic illustration of FIG. 5 further zoomed in and partially showing the next level content data.
Figure 7:
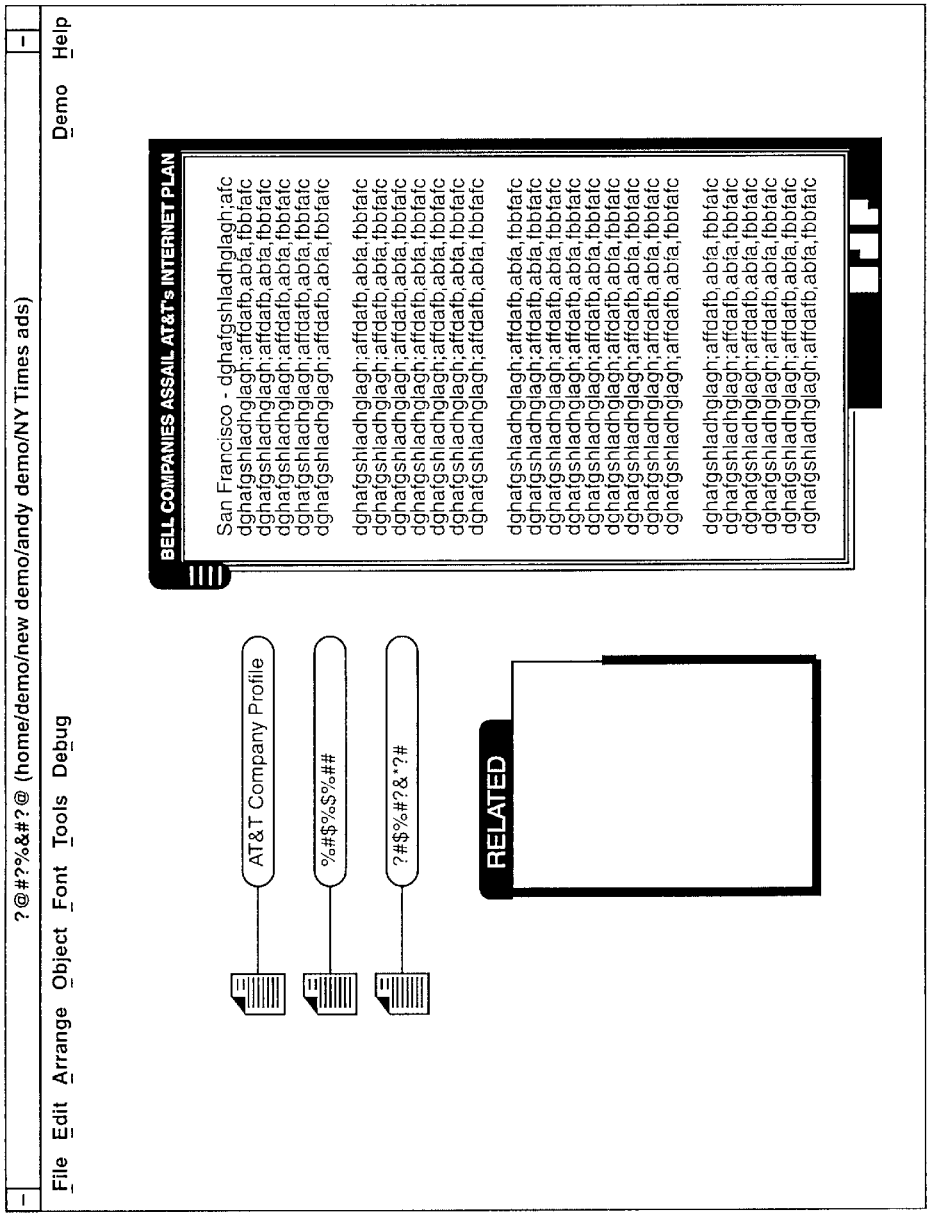
FIG. 7 is a schematic illustration representing the display of FIG. 6 zoomed in further and showing the next level content data.

As the user further zooms in on the advertisement, the advertisement begins to fade out and the content data of the next level (i.e., zoom level 1) begins to fade in, such as shown in FIG. 6. As the image is further zoomed in, the advertisement fully fades out and the new content data is fully displayed, such as shown in FIG. 7, such representing zoom level 1. Referring again to FIG. 1, display D2 (FIG. 7) is displayed at zoom level 1 and represents content data that is different from the content data of display D1 (FIG. 2). Further, the display of FIG. 6 represents a zoom level somewhere between zoom levels 0.5 and 1, for example, 0.75.

Still referring to FIG. 1, depending on which content data is zoomed in, different advertisements (e.g. advertisements A2, A3) are displayed, and as the user zooms from zoom level 1 to zoom level 2, still other advertisements (advertisements A4, A5 and A6) are displayed depending on which content data is zoomed-in.

Figure 8:
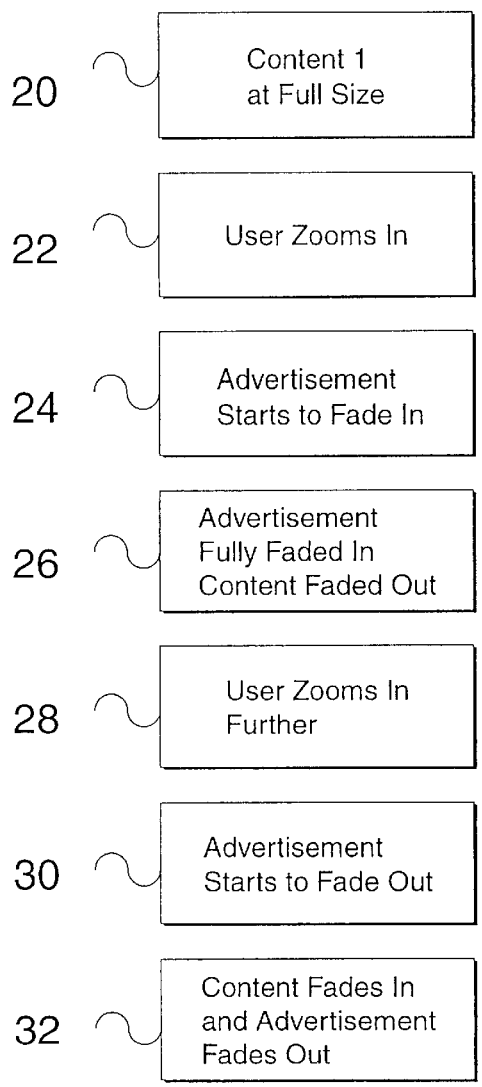
FIG. 8 is a flow chart of method of advertising in zoomable content in accordance with the present invention.

The operation of the present invention will now be described with reference to the flow chart of FIG. 8. Initially, the content data is supplied at its full size (greatest size), corresponding to zoom level 0 (also identified as "scale"), at instruction 20. As the user zooms in, at instruction 22, a portion of the display is enlarged (e.g., FIG. 3), and as the user further zooms in, the data content of the first level (content 1) approaches a maximum display size and begins to fade out, and at the same time, an advertisement approaches its minimum size, and begins to fade in, at instruction 24, such as schematically shown in FIG. 4. Thus, each content level is provided with a maximum zoom level above which it begins to fade out, and each advertisement is provided with a minimum zoom level at which it begins to fade in. As the image is further zoomed in, the first data content "grows" to a level above its maximum size and fades out, and at the same time, the advertisement fully fades in, at instruction 26. Thus, each content data is provided with a fade-out zoom level at which it is fully faded out, and each advertisement is provided with a fade-in level at which it is fully faded-in. As the user further zooms in, at instruction 28, the advertisement grows in size, and when the zoom level is further increased, at instruction 30, the advertisement begins to fade out at some predetermined maximum size and, at the same time, the content data of the next level ("content 2") begins to fade in at its minimum size, such as shown in FIG. 6. Thus, each advertisement is provided with a maximum zoom level above which it begins to fade out, and each content level has a minimum zoom level at which it begins to fade in. Still further, as the user zooms in on the displayed image, at instruction 32, the advertisement fades out, and at the same time, the content of the next level fully fades in. Thus, each advertisement is provided with a fade-out level at which it is fully faded out and each content level is provided with a fade in level at which it is fully faded in.

In addition to zooming in on zoomable content data, such content data may also be zoomed out wherein advertisements also are displayed between the content data of the different zoom levels, and since the operation of zooming out in which advertisements are inserted between the content levels operates in a manner inverse to zooming in, as previously discussed, a discussion of zooming out is omitted herein.

From the foregoing discussion, it is seen that zooming navigation of zoomable content data allows a user to zoom from one content to another (i.e. one content level to another content level), wherein advertisements are disposed between each of the content levels. Such zoomable content data may be in the form of data stored on a record medium, such as a CD-ROM, a hard drive, a digital versatile disk (DVD), etc., or may be data downloaded from, for example, an internet service provider.

In an alternative embodiment of the present invention, an advertisement is displayed during the zooming in (or zooming out) of content data, wherein the advertisement fades in and fades out while the same content data is displayed. Referring back to FIG. 1 an advertisement may be provided at, for example, zoom level 0.2, wherein the advertisement fades in at zoom level 0.1 and fades out at zoom level 0.3, but the content data of, for example, zoom level 0 remains displayed during both fade-in and fade-out of the advertisement. That is, as the user zooms in on content data, an advertisement fades in and then fades out while such content data is still being zoomed in on. Thus, advertisements may be provided at various zoom levels between content levels.

The present invention may further be applied to providing advertisements at the "top" level (e.g. zoom level 0), wherein such advertisements are relatively small and provide minimal information, but as the user zooms in on one of the advertisements, additional information about the advertisement is displayed. That is, new advertisement data is provided during such zooming as the zoom level reaches an appropriate level, for example, by causing the "top level" advertisement to fade out while new advertising information fades in. Thus, by providing only a minimal representation of the advertisement at the top level, and utilizing so-called "semantic" zooming to provide more detailed information, available screen "real estate" for content is maximized.

In still yet a further embodiment of the present invention, advertisements are provided between so-called "panning" positions of the displayed page. Panning of a display allows the user to view different areas of an image (whether zoomed or not zoomed). In accordance with the present invention, advertisements fade in and fade out as the panning "level" is changed by the user. The so-called panning level represents that particular portion of the content data (for a given level) that is currently being displayed, and a particular advertisement is "triggered" to fade in at a particular panning level. Thus, as the image is panned, for example, to the right, an advertisement fades in until completely displayed, and as the image is continued to be panned to the right, the advertisement fades out until it is completely not displayed. Panning up, down, left, diagonally, etc. similarly may cause advertisements to fade in and fade out.

While the present invention has been particularly shown and described in conjunction with preferred embodiments above thereof, it will be readily appreciated by those of ordinary skill in the art that various changes may be made without departing from the spirit and scope of the invention. For example, while the present invention has been described as displaying advertisements between content levels, as well as panning levels, the present invention is not limited to the display of advertisements and may be applied to the display of other types of information including, for example, entertaining-type images, or other data that may or may not be related to the content data.

Therefore, it is intended that the appended claims be interpreted as including the embodiments described herein, the alternatives mentioned above and all equivalents thereto.

What is claimed is:

1. Apparatus for advertising in zoomable content, comprising:
    display means for displaying first content data, said first content data being displayed at a first zoom level;
    means for receiving a zoom request from a user; and
    control means for controlling said display means to display, when said display means is displaying said first content data at said first zoom level and a zoom request is received, a portion of said first content data with a portion of an advertisement at a second zoom level, and for controlling said display means to display, when said display means is displaying at said second zoom level and a zoom request is received, said advertisement without said first content data at a third zoom level.

2. The apparatus of claim 1, wherein said portion of said first content data being displayed at said second zoom level is enlarged relative to a size of said portion when displayed at said first zoom level.

3. The apparatus of claim 1, wherein said control means is operable to control said display means to zoom in on a portion of said first content data in response to receiving said zoom request, and to control said display means to cause said advertisement to fade in as said portion of said first content data is zoomed in.

4. The apparatus of claim 3, wherein said control means is operable to control said display means to cause said first content data to fade out as said advertisement fades in.

5. The apparatus of claim 4, wherein said control means is operable to control said display means to fully fade out said first content data when said advertisement fully fades in.

6. The apparatus of claim 1, wherein said control means is further operable to control said display means to display, when said display means is displaying at said third zoom level and a zoom request is received, a portion of a second content data with a portion of said advertisement at a fourth zoom level, and to control said display means to display, when said display means is displaying at said fourth zoom level and a zoom request is received, the second content data without said advertisement at a fifth zoom level.

7. The apparatus of claim 6, wherein said portion of said second content data being displayed at said fourth zoom level is enlarged at said fifth zoom level.

8. The apparatus of claim 6, wherein said control means is operable to control said display means to zoom in on a portion of said advertisement in response to receiving said zoom request, and to control said display means to cause said second content data to fade in as said portion of said advertisement is zoomed in.

9. The apparatus of claim 8, wherein said control means is operable to control said display means to cause said advertisement to fade out as said second content data zooms in.

10. The apparatus of claim 9, wherein said control means is operable to control said display means to fully fade out said advertisement when said second content data is fully zoomed in.

11. Method of advertising in zoomable content, comprising the steps of:
    displaying first content data at a first zoom level;
    receiving a zoom request from a user;
    displaying a portion of said first content data with a portion of an advertisement at a second zoom level in response to receiving the zoom request;
    receiving a second zoom request from the user; and
    displaying said advertisement without said first content data at a third zoom level when the second zoom request is received.

12. The method of claim 11, wherein said portion of said first content data being displayed at said second zoom level is enlarged relative to a size of said portion when displayed at said first zoom level.

13. The method of claim 11, wherein said second displaying step is carried out by zooming in on a portion of said first content data and fading in said advertisement as said portion of said first content data zooms in.

14. The method of claim 13, wherein said third displaying step is carried out by fading out said first content data as said advertisement fades in.

15. The method of claim 14, wherein said third displaying step further is carried out by fully fading out said first content data when said advertisement fully fades in.

16. The method of claim 11, further comprising the steps of:

receiving a third zoom request from the user;

displaying a portion of a second content data with a portion of said advertisement at a fourth zoom level in response to receiving the third zoom request;

receiving a fourth zoom request from the user;

displaying the second content data without said advertisement at a fifth zoom level when the fourth zoom request is received.

17. The method of claim 16, wherein said portion of said second content data being displayed at said fourth zoom level is enlarged at said fifth zoom level.

18. The method of claim 16, wherein said fourth displaying step is carried out by zooming in on a portion of said advertisement and fading in said second content data as said portion of said advertisement is zoomed in.

19. The method of claim 18, wherein said fifth displaying step is carried out by fading out said advertisement as said second content data zooms in.

20. The method of claim 19, wherein said fifth displaying step further is carried out by fully fading out said advertisement when said second content data is fully zoomed in.

21. Apparatus for advertising in pannable content, comprising:

display means for displaying a portion of content data, said portion of said content data being displayed being defined as a panning level;

means for receiving a panning request from a user; and control means for controlling said display means to pan said content data in a direction in accordance with said panning request, and for controlling said display means to display with said content data an advertisement at a predetermined panning level.

22. The apparatus of claim 21, wherein said control means controls said display means to fade in said advertisement at a first panning level and to fade out said advertisement at a second panning level.

23. Method of advertising in pannable content, comprising the steps of:

displaying a portion of content data on a display, said portion of said content data being displayed being defined as a panning level;

receiving a panning request from a user;

panning said content data in a direction in accordance with said panning request; and displaying with said content data on said display an advertisement at a predetermined panning level.

24. The method of claim 23, wherein said step of displaying said advertisement is carried out by fading in said advertisement at a first panning level and fading out said advertisement at a second panning level.

* * * * *

UNITED STATES PATENT AND TRADEMARK OFFICE
CERTIFICATE OF CORRECTION

PATENT NO. : 6,034,661

DATED : Mar. 7, 2000

INVENTOR(s) : Servan-Scheiber et al.

It is certified that error appears in the above-identified patent and that said Letters Patent is hereby corrected as shown below:

[19] Change "Servan-Scheiber et al" to
--Servan-Schreiber et al.--

[75] Inventors: Change "Servan-Scheiber" to
--Servan-Schreiber--

Signed and Sealed this

Third Day of April, 2001

*Attest:*

NICHOLAS P. GODICI

*Attesting Officer*     *Acting Director of the United States Patent and Trademark Office*